(12) United States Patent
Wilsher

(10) Patent No.: US 8,081,350 B2
(45) Date of Patent: Dec. 20, 2011

(54) FIBER OPTIC IMAGING DEVICE

(75) Inventor: Michael J. Wilsher, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 1046 days.

(21) Appl. No.: 11/952,396

(22) Filed: Dec. 7, 2007

(65) Prior Publication Data

US 2009/0147322 A1   Jun. 11, 2009

(51) Int. Cl.
*H04N 1/04*   (2006.01)

(52) U.S. Cl. ......... 358/471; 358/474; 358/400; 358/497

(58) Field of Classification Search .............. 358/471, 358/474, 497, 494, 400, 500, 505; 399/211, 399/212, 377, 378, 379; 355/75; 359/668
See application file for complete search history.

(56) References Cited

U.S. PATENT DOCUMENTS

| | | |
|---|---|---|
| 5,072,252 A | 12/1991 | Howseman, Jr. |
| 5,973,769 A | 10/1999 | Reiko |
| 6,313,954 B1 | 11/2001 | Tai |
| 6,665,128 B1 * | 12/2003 | Tai ................ 359/668 |

* cited by examiner

*Primary Examiner* — Cheukfan Lee
(74) *Attorney, Agent, or Firm* — Oliff & Berridge, PLC

(57) ABSTRACT

An fiber optic imaging device utilizing fiber optics for imaging portions of documents of varying shapes and/or sizes. For example, for imaging a book or any document having a centerfold, where the document will not lay flat (non-planar) against the platen of the image forming device. The device may be shaped to fit in the centerfold of an open document between the platen of the copying device and the document. Additionally, the fiber optic imaging device may also allow for performing a geometric translation based upon a portion of the document, for facilitating document reproduction.

12 Claims, 3 Drawing Sheets

FIBER OPTIC IMAGING DEVICE

BACKGROUND

This disclosure is directed to devices and methods for imaging of documents and correcting for the distortion that results with image forming devices and documents that tend to be non-planar, such as the centerfolds of open books.

Generally imaging a non-planar document with a centerfold is accomplished by placing the open document face down on the surface of the platen of a xerographic copier or document scanner. Since the document does not lay flat against the platen, the raised portion, with respect to the platen, of the document falls outside of the focal length range for which the image forming device may properly project the image of the document. Therefore, the portion of the document is not clearly imaged, resulting in the copy of the raised portion being compressed and dark causing portions of the copy to be out of focus and/or distorted. Additionally, when copying a non-planar document, such as a book, on an image forming device, the document is pressed down onto the platen of the copying device, which may result in damage to the document.

Attempts have been made in the past to resolve similar problems to those discussed above. U.S. Pat. No. 5,072,252 discloses a bundle of fiber optics the size of a book as an accessory to help prevent damage to the spine while copying the book. However, this accessory is the size of the entire book and does not image the spine. U.S. Pat. No. 5,973,769 discloses a plastic "T" shaped insert to eliminate the shadow that occurs while copying a book. However, this insert does not image the area of the spine but instead reflects the light to prevent the dark area from occurring. U.S. Pat. No. 6,313,954 discloses a corrective tens the size of the book inserted under the book while copying the book.

SUMMARY

A drawback with conventional methods and systems associated with imaging non-planar documents, is the degradation of the image due to poor optical characteristics, of the raised portion, and the need for devices of varying sizes and shapes to accommodate a wide variety of products being imaged. It should be appreciated that the non-planar document being imaged is not limited to a document with a centerfold, typical of a standard book. The methods and systems disclosed herein may be used with any type of image being reproduced where the document is not conducive to being positioned on a flat plane, such as a platen of an image forming device. For example, the methods and systems disclosed herein may be adapted for reproducing any shaped device.

It should be appreciated that the methods and systems disclosed herein refer to imaged documents. Additionally, as referred herein, a document is any object where an image forming device may be utilized to capture any image, text or illustration thereon. An image forming device is considered to be any type of device used to reproduce a document, such as, a copier, a scanner, a reader, a camera, or any other device that captures an image.

In related art systems, a user is limited to documents of particular sizes and shapes, while ensuring uniform quality. This situation often necessitates a user expending considerable time and effort in reproducing and page checking a production copy to ensure that the images were reproduced with acceptable quality. Related art systems likewise provide no means for providing a device that mimics the shape of the object being reproduced, thereby preventing damage to the original document. For example, the related art systems all require the user to provide some type of external pressure to the side opposite the side being imaged, to ensure proper contact with the device, causing unnecessary stress to the document.

It would be advantageous in view of the above-identified shortfalls, to provide methods and systems, within or related to one or more image forming devices, that would allow a system, and a user, to image both a planar or a non-planar document while ensuring increased quality.

Additionally, it would be beneficial for a user to have a device that is capable of being manufactured in various sizes, for example, small, medium and large. However, it would also be beneficial to have a single size of the device that can be applied to a variety of documents, and is sized for a variety of various image forming device. For example, a single device could be used on a variety of image forming devices each having platens of varying shapes and or configurations. Finally, it would be beneficial to provide a capability whereby a method or sub-system exists within an image forming device to detect when an non-planar shaped document is placed on the platen and that quality improvements could be realized by the use of the systems and methods disclosed herein.

The following exemplary embodiments overcome the deficiencies discussed above Many of the encountered deficiencies are based upon the size of the document being imaged and the shape of the document. Since the existing devices are the size of the book, books of different sizes require different devices, the size of the book, in order to perform. Thus, it is difficult and expensive to copy documents of varying sizes.

The systems and methods disclosed herein include an fiber optic imaging device consisting of a plurality of optical fibers that may be positioned to image a document, specifically this may include following the curve of the document from the apex of a centerfold to each flat portion of the document that extends from the apex of the centerfold, or any other non-planar surface of a document. Further, the image forming device may provide a user with some form of visual, audible or sensory indication that the fiber optic imaging device may improve the overall quality of the document reproduction based on sensors and/or devices that are internal or external to the image forming device. The fiber optic imaging device may be placed between the document and the platen of the imaging forming device. Further, the device may identify the center of the document further improving the overall positioning and imaging of the document.

Furthermore, a geometric translation may be developed and applied to an image of the document thereby further enhancing the reproduction copy of the document.

An exemplary embodiment according to this disclosure may provide fiber optic imaging devices for imaging the centerfolds of documents of different sizes and/or shapes. The fiber optic imaging device may have a tubular shape with a triangular cross-section, with a plurality of fiber optics disposed within the device. The optical fibers having a first end being positioned so as to form a first surface that may be perpendicular to the optical fibers and parallel to a platen of the image forming device. Additionally, the optical fibers may have a second end forming at least one surface that is perpendicular to the surface of the document being imaged.

Another exemplary embodiment according to this disclosure may have a plurality of concave sides. Additionally, another exemplary, embodiment according to this disclosure may have a plurality of flat sides when viewed along the cross-section.

The methods of this disclosure may provide a geometric translation to linearize the image of the centerfold allowing production of an undistorted copy of the document being imaged. The line of correction for the geometric translation may be based upon the center of the document, the shape of the document, the size of the image forming device and the location of the document on the image forming device. Furthermore, the methods of this disclosure may correct for the light difference which may occur between various portions of the document being reproduced or imaged.

The systems and methods of this disclosure may provide a user interface that allows a user to interact with the imaging forming device. For example, the image forming device may alert a user to the possibility for reduced quality due to the size, shape or configuration of the document. It should be appreciated that these factors are not considered limiting but merely illustrative of the types of factors that may initiate some type of user alert.

BRIEF DESCRIPTION OF THE DRAWINGS

Various exemplary embodiments of disclosed devices and methods will be described, in detail, with reference to the following figures, wherein.

EMBODIMENTS

The following description of various exemplary embodiments of devises and methods for imaging documents that address for the distortion that results from imaging of irregular shaped documents, such as, bound documents, may refer to and/or illustrate components of a xerographic image forming device as one specific type of system for the sake of clarity and ease of depiction and description. However, it should be appreciated that, in the various exemplary embodiments, a fiber optic imaging device, as discussed below, can be equally applied to any known, or later-developed, device in which imaging irregularly shaped documents can be applied.

Figure 1:
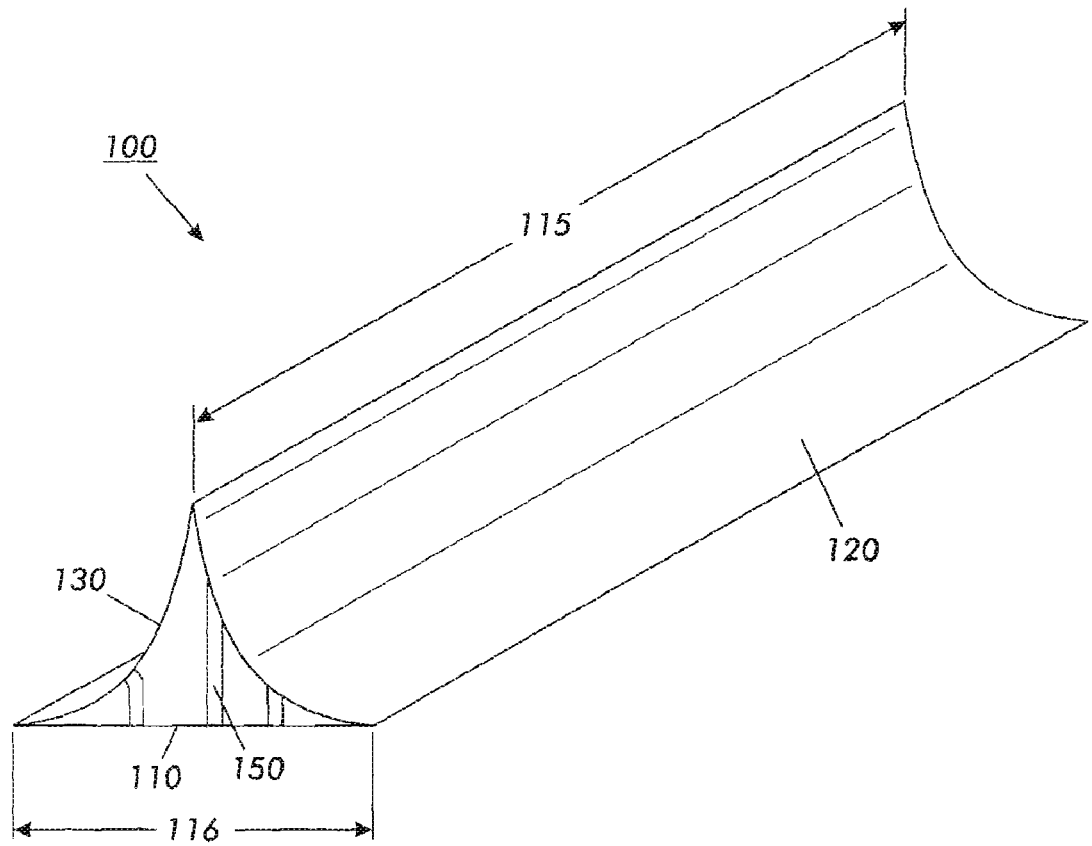
FIG. 1 illustrates an exemplary embodiment of the fiber optic imaging device.

FIG. 1 illustrates a perspective view of an exemplary embodiment of the fiber optic imaging device 100. The fiber optic imaging device 100 may have sides 110, 120 and 130, forming substantially a triangular cross-section, when viewed in the cross section, surrounding a plurality of optical fibers 150. It should be appreciated that the fiber optic imaging device is not limited to having a substantially triangular cross-section, but may be any conceivable shape required by the document being imaged. Side 110 may be flat and may be disposed on the platen of an image forming device. Additionally, the fiber optic imaging device 100 may have a first dimension 116 and a second dimension 115 where the first dimension 116 is less than the second dimension 115.

In an exemplary embodiment, sides 120 and 130, as shown, may be concave, wherein the concave surfaces are represented by $e^x$. In another exemplary embodiment, the plurality of sides 110, 120 and 130 may be straight, when viewed in the cross section. This triangular shape may allow for easier manufacturing of the optical fibers. Furthermore, in an exemplary embodiment, where sides 120 and 130 meet along the second dimension, they may form a flat area along the length of the second dimension, and along a portion of the first dimension. This flat area may be metal, or any other materials that would add strength for the apex of a centerfold of a document and allow for ease of manufacturing. Additionally, this flat area may fit in bindings of documents being imaged where images are usually not present and, therefore, this area of the binding may not be imaged. It should be appreciated that, the plurality of sides may be of various shapes with curved, concave, convex and straight portions, and any other conceivable shape, to accommodate different types of documents.

In another exemplary embodiment, the plurality of optical fibers 150 may be aligned so to form a first surface where the first ends may be perpendicular to the first surface and parallel to a platen of the image forming device, and the second ends forming at least one surface that is perpendicular with the second surface and parallel to the document being imaged. In another exemplary embodiment, the plurality of optical fibers 150 may be aligned so to form a first surface where the first ends may be perpendicular to the first surface and parallel to a platen of the image forming device, and the plurality of optical fibers extending perpendicularly from the first surface so that a second end of the optical fibers intersect at least one additional surface at an angle, the second end may be formed to fit parallel to the second surface formed by the second ends of the optical fibers. The forming of the second end so as to be parallel to the second surface, may be accomplished by any variety of means that are well known in the art and are not further discussed here.

In another exemplary embodiment, the sides and the plurality of optical fibers may be made out of glass. It should be appreciated that the glass may be made by various cuts and polished materials such as quartz glass or glass with a sensor core of one refractive index for the optical fibers and a slightly different refractive index for the sides.

In another exemplary embodiment, the plurality of optical fibers may be made out of a plastic polymer. Since the optical fibers refocus and re-illuminate the document during the imaging process, the material of the sides may be of any transparent material which does not interfere with the refocusing and re-illuminating of the document. Additionally, it should be appreciated that optical fibers are well known and therefore, the plurality of optical fibers may be made of any known or future known material, and will not be further discussed here.

The density of optical fibers of the plurality of optical fibers 150 may be in the order of two to four times the resolution in which the image is scanned. For example, if the document is scanned at about 600 dots per inch, the plurality of fiber optics may be in the order of about 1200 to about 2400 fibers per linear inch. However, it should be appreciated for that for greater resolutions or finer fibers, the number of optical fibers per inch may be variable.

Figure 2:
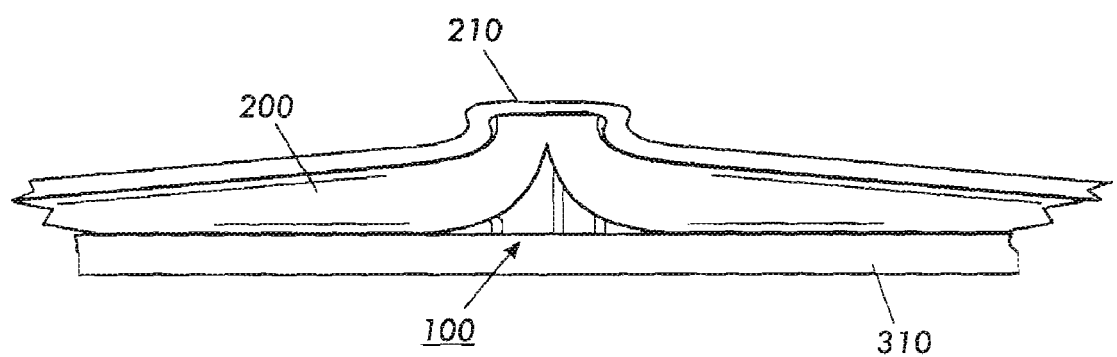
FIG. 2 illustrates in plan view a centerfold document in use with an exemplary embodiment of the fiber optic imaging device.

FIG. 2 illustrates an exemplary embodiment of the fiber optic imaging device 100 in plan view inserted into a document being imaged 200 with a centerfold 210. The apex of the centerfold of the document rests on top of the fiber optic imaging device 100. The fiber optic imaging device 100 provides support for the centerfold of the document being imaged so the document may be imaged without causing damage to the centerfold, when a force is applied to the document being imaged to ensure uniform contact with the platen of the image forming device.

It should be appreciated that the fiber optic imaging device 110 may be manufactured in various sizes, i.e., small, medium and large. However, it is anticipated that a single fiber optic imaging device may be used for a variety of documents and image forming devices of varying sizes.

Figure 3:
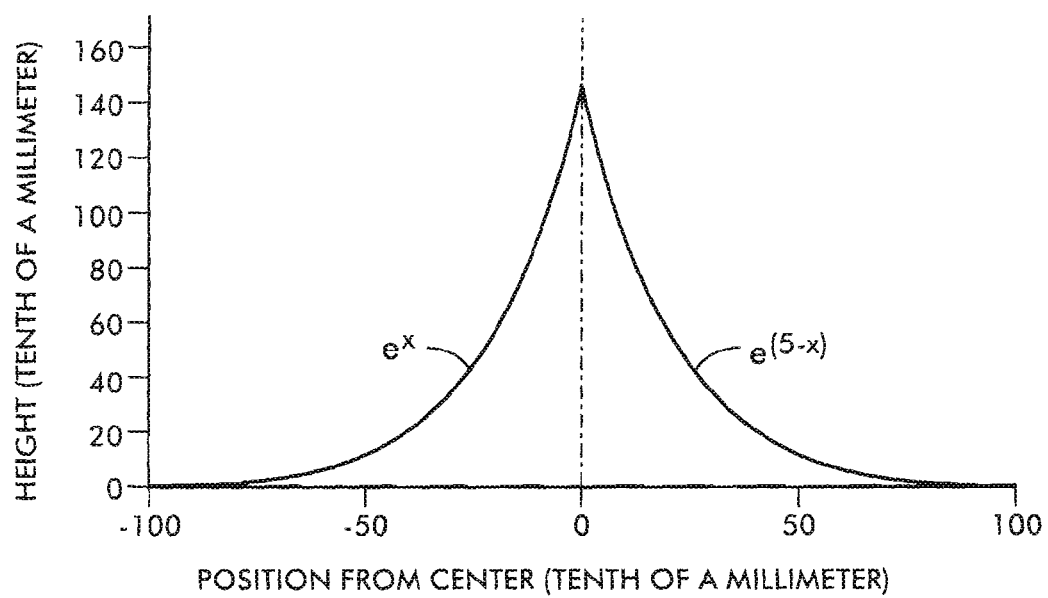
FIG. 3 illustrates an exemplary embodiment of the shape of the centerfold of a document.

FIG. 3 illustrates an exemplary embodiment of a shape extending from the centerfold to each flat portions of a document being imaged. The graph illustrates an $e^x$ curve for $x=0$ to 5 followed by an $e^{(5-x)}$ curve. The $e^x$ curve allows for a gentle curve from the apex of the centerfold to each flat portion of the document with uniform contact between the document and the imaging device.

Figure 4:
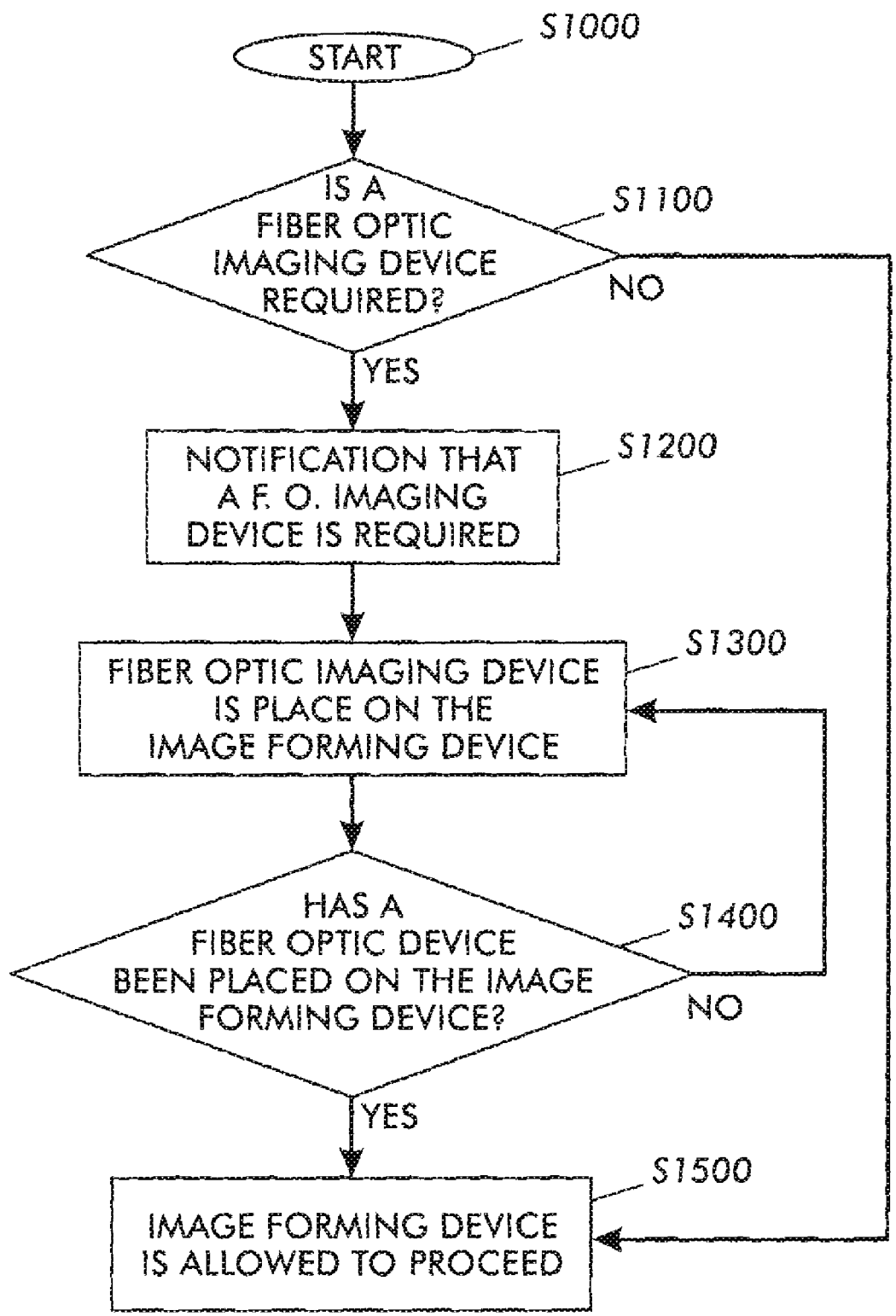
FIG. 4 illustrates a flow chart disclosing a method of imaging a non-planar document.

FIG. 4 is a flow diagram of an exemplary method for utilizing a fiber optic imaging device on an image forming device. As shown in FIG. 1, operation of the method begins at step S1000 in which a method for utilizing a fiber optic imaging device is initiated. The method may be initiated automatically or manually, for example, by a user initializing the image forming device. Operation of the method continues to step S1100.

In step S1100, a determination is made if a fiber optic imaging device is required. If in step S1100, a determination is made that a fiber optic imaging device is not required, operation of the method proceeds directly to step S1500.

If in step S1100, a determination is made that a fiber optic imaging device is required, operation of the method continues directly to step S1200.

In step S1200, a user is alerted that a fiber optic imaging device is required.

In step S1300, a fiber optic imaging device is placed on the image forming device.

In step S1400, a determination is made if a fiber optic imaging device has been placed on the image forming device. When a fiber optic imaging device is placed on the image forming device, then the method proceeds directly to step S1500.

In step S1500, the image forming device is allowed to proceed.

It should be appreciated that given the required inputs, software algorithms, hardware circuits, and, or any combination of software and hardware control elements, may be used to implement the individual devices and/or units in the exemplary fiber optic imaging device system.

The above detailed description of exemplary embodiments of systems and methods for defining a fiber optic imaging device usage policy in an image forming device is meant to be illustrative, and in no way limiting. The above detailed description of systems and methods is not intended to be exhaustive or to limit this disclosure to any precise embodiments or feature disclosed. Modifications and variations are possible in light of the above teaching. The above embodiments were chosen in order to clearly explain the principles of operation of the systems and methods according to the disclosure and their practical application to enable others skilled in the art to utilize various embodiments, potentially with various modifications, suited to a particular use contemplated. Also, various presently unforeseen or unanticipated alternatives, modifications, variations or improvements therein may be subsequently made by those skilled in the art, and are also intended to be encompassed by the following claims.

What is claimed is:

1. An accessory device for imaging a document with a centerfold, the device comprising:
    a tubular device comprising a plurality of sides, the tubular device having a first dimension and a second dimension where the first dimension is less than the second dimension;
    a plurality of optical fibers each having a first end and a second end, the first end of each of the optical fibers arranged to form a first surface that is perpendicular to the optical fibers and is parallel to a platen of an image forming device, and the second end of the optical fibers arranged to form a second and a third surface that are parallel to a surface of a document being imaged.

2. The accessory device of claim 1, wherein the second and third surfaces are concave.

3. The accessory device of claim 2, wherein the second and third surfaces are represented by the equation $e^x$.

4. The accessory device of claim 1, wherein the plurality of optical fibers is less than approximately 1200 optical fibers per inch.

5. The accessory device of claim 1, wherein the plurality of optical fibers is between approximately 1200 to 2400 fibers per inch.

6. The accessory device of claim 1, wherein the plurality of optical fibers is greater than approximately 2400 fibers per inch.

7. The accessory device of claim 1, wherein the optical fibers are plastic polymer.

8. The accessory device of claim 1, wherein the optical fibers are quartz glass.

9. A method for imaging a document with a centerfold with an accessory device, the method comprising:
    inserting an accessory device into a centerfold of a document;
    placing the device and the document on a platen of an imaging device;
    determining a height of a page position from the platen of the imaging device;
    registering a center of the document;
    calculating a line of correction;
    performing a geometric translation based upon the height, the center and the line of correction; and
    reconstructing the image based upon the geometric translation,
    wherein at least a plurality of the determining, the registering, the calculating, the performing and the reconstructing are automated in the imaging device.

10. The method of claim 9, further comprising:
    calculating the illumination of the centerfold;
    performing a geometric translation based upon the height, the center, the line of correction and the illumination of the centerfold; and
    reconstructing the image based upon the geometric translation,
    wherein the calculating the illumination is automated in the imaging device.

11. The method of claim 9, wherein the imaging device is a xerographic copier.

12. The method of claim 9, wherein the imaging device is a document scanning device.

* * * * *